United States Patent
Eswara et al.

(10) Patent No.: US 12,361,709 B2
(45) Date of Patent: Jul. 15, 2025

(54) VIDEO MONITORING WALL WITH DIRECTIONAL OPERATOR ALERTS

(71) Applicant: HONEYWELL INTERNATIONAL INC., Charlotte, NC (US)

(72) Inventors: Lalitha M. Eswara, Bangalore (IN); Jitendra S. Chaurasia, Bengaluru (IN); Mourian Balasubramanian, Bangalore (IN)

(73) Assignee: HONEYWELL INTERNATIONAL INC., Charlotte, NC (US)

(*) Notice: Subject to any disclaimer, the term of this patent is extended or adjusted under 35 U.S.C. 154(b) by 99 days.

(21) Appl. No.: 18/485,690

(22) Filed: Oct. 12, 2023

(65) Prior Publication Data

US 2024/0127591 A1 Apr. 18, 2024

(30) Foreign Application Priority Data

Oct. 18, 2022 (IN) .............................. 202211059507

(51) Int. Cl.
*G06V 20/40* (2022.01)
*G06F 3/14* (2006.01)
(Continued)

(52) U.S. Cl.
CPC ............ *G06V 20/41* (2022.01); *G06F 3/1446* (2013.01); *G06T 7/70* (2017.01); *G06V 20/44* (2022.01);
(Continued)

(58) Field of Classification Search
None
See application file for complete search history.

(56) References Cited

U.S. PATENT DOCUMENTS 6,873,924 B1* 3/2005 Welles, II .............. G01C 11/02
702/85
8,295,597 B1* 10/2012 Sharma .................. G06V 20/41
382/173
(Continued)

FOREIGN PATENT DOCUMENTS

KR 102056854 B1 12/2019
WO 2007095994 A1 8/2007
(Continued)

OTHER PUBLICATIONS

Extended European Search Report, EP Application No. 23199442.7, European Patent Office, Mar. 21, 2024 (10 pages).
(Continued)

*Primary Examiner* — Daniel T Tekle
(74) *Attorney, Agent, or Firm* — Seager, Tufte & Wickhem, LLP (57) ABSTRACT

A video monitoring system includes a video monitoring wall that is configured to display a plurality of video streams. One or more cameras are disposed relative to the video monitoring wall. One or more directional speakers are disposed relative to the video monitoring wall such that each of the one or more directional speakers is directed toward a corresponding location on the viewing side of the video monitoring wall. A controller is configured to identify that a desired action should be taken by a particular operator, based at least in part on the one or more video streams assigned to the particular operator. The controller is configured to analyze one or more local video streams from the cameras to ascertain a current location of the particular operator and to direct an audio message to the current location of the operator using one or more of the directional speakers.

20 Claims, 7 Drawing Sheets

(51) Int. Cl.
*G06T 7/70* (2017.01)
*G06V 20/52* (2022.01)
*G06V 40/16* (2022.01)
*H04N 23/695* (2023.01)
*H04N 23/90* (2023.01)
*H04R 1/40* (2006.01)
*H04R 3/12* (2006.01)

(52) U.S. Cl.
CPC ............ *G06V 20/52* (2022.01); *G06V 40/172* (2022.01); *H04N 23/695* (2023.01); *H04N 23/90* (2023.01); *H04R 1/403* (2013.01); *H04R 3/12* (2013.01); *G06T 2207/10016* (2013.01); *G06T 2207/30201* (2013.01); *G06T 2207/30232* (2013.01); *H04R 2499/15* (2013.01)

(56) References Cited

U.S. PATENT DOCUMENTS

| | | | |
|---|---|---|---|
| 8,711,201 B2* | 4/2014 | Gorzynski | H04N 7/147 348/14.1 |
| 8,810,656 B2* | 8/2014 | Keller | G08B 13/19634 348/154 |
| 10,540,135 B1 | 1/2020 | Fitzgerald et al. | |
| 2003/0202099 A1* | 10/2003 | Nakamura | H04N 5/77 348/E7.086 |
| 2004/0133477 A1* | 7/2004 | Morris | G06Q 30/0603 348/E7.086 |
| 2008/0240579 A1* | 10/2008 | Enomoto | G06V 20/52 382/224 |
| 2012/0309551 A1* | 12/2012 | Holzhacker | A63B 24/0087 472/136 |
| 2016/0132731 A1* | 5/2016 | Hisada | G06F 18/40 382/103 |
| 2021/0201269 A1* | 7/2021 | Ainsworth | G06V 40/166 |

FOREIGN PATENT DOCUMENTS

WO 2015164461 A1 10/2015
WO 2016082881 A1 6/2016

OTHER PUBLICATIONS

Felanasoft, "Video Wall, Panic Button and Alarm Monitor for Security Officers," 7 pages. Jul. 4, 2019. Accessed Jun. 3, 2022.

Holosonics, "Digital Signage Directional Sound Speakers," 7 pages. Accessed Jun. 3, 2022.

* cited by examiner

VIDEO MONITORING WALL WITH DIRECTIONAL OPERATOR ALERTS

CROSS-REFERENCE TO RELATED APPLICATIONS

This application claims priority pursuant to 35 U.S.C. 119(a) to Indian Application No. 202211059507, filed Oct. 18, 2022, which application is incorporated herein by reference in its entirety.

TECHNICAL FIELD

The present disclosure relates to video monitoring walls and more particularly to video monitoring walls with improved communication between the video monitoring wall and the operators tasked with monitoring the video monitoring wall.

BACKGROUND

Video monitoring walls can include a large number of video displays that are configured to display video streams from each of a large number of video cameras. Video monitoring walls also often display other information such as alerts, warnings, messages, geographical maps, sensor readings, information feeds, standard operating procedures (SOP) and/or other information. The video monitoring wall is often monitored by several operators. In some cases, it may be useful for the video monitoring wall to be able to communicate with a particular operator, such as to inform the particular operator that a possible event is occurring. In so doing, it may be desirable to provide an audible alert or audible message to the particular operator without unduly disturbing the other operators.

SUMMARY

The present disclosure relates to video monitoring walls and more particularly to video monitoring walls with improved communication between the video monitoring wall and the operators tasked with monitoring the video monitoring wall. An example may be found in a video monitoring system that includes one or more displays that are arranged to form a video monitoring wall. The video monitoring wall is configured to display a plurality of video streams, wherein each of the plurality of video streams is assigned to a particular one of a plurality of operators for monitoring. One or more cameras are disposed relative to the video monitoring wall such that each of the one or more cameras has a field of view (FOV) that is directed toward a viewing side of the video monitoring wall. Each of the one or more cameras produces a local video stream. One or more directional speakers are disposed relative to the video monitoring wall such that each of the one or more directional speakers is directed toward a corresponding location on the viewing side of the video monitoring wall. A controller is operably coupled with the one or more displays, the one or more cameras and the one or more directional speakers. The controller is configured to identify that a desired action should be taken by a particular one of the plurality of operators. The desired action is based at least in part on the one or more video streams assigned to the particular one of the plurality of operators. The controller is configured to analyze the one or more local video streams to ascertain a current location of the particular one of the plurality of operators in front of the video monitoring wall and to direct a directional audio message to the current location of the particular one of the plurality of operators using one or more of the directional speakers.

Another example may be found in a method for monitoring a video surveillance system via a video monitoring wall. The illustrative method includes identifying that a desired action should be taken by a particular one of a plurality of operators tasked with monitoring a plurality of video streams of the video surveillance system. One or more local video streams captured by one or more cameras that each have a field of view (FOV) that is directed toward a viewing side of the video monitoring wall are analyzed to ascertain a current location of the particular one of the plurality of operators in front of the video monitoring wall. An audio message is directed to the current location of the particular one of the plurality of operators using one or more directional speakers.

Another example may be found in a non-transitory computer readable medium having instructions stored thereon. When the instructions are executed by one or more processors, the one or more processors are caused to identify that a desired action should be taken by a particular one of a plurality of operators tasked with monitoring a plurality of video streams of a video surveillance system. The one or more processors are caused to analyze one or more local video streams captured by one or more cameras that each have a field of view (FOV) that is directed toward a viewing side of a video monitoring wall of the video surveillance system to ascertain a current location of the particular one of the plurality of operators in front of the video monitoring wall. The one or more processors are caused to direct an audio message to the current location of the particular one of the plurality of operators using one or more directional speakers.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments of the disclosure in connection with the accompanying drawings, in which.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements. The drawings, which are not necessarily to scale, are not intended to limit the scope of the disclosure. In some of the figures, elements not believed necessary to an understanding of relationships among illustrated components may have been omitted for clarity.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

Figure 1:
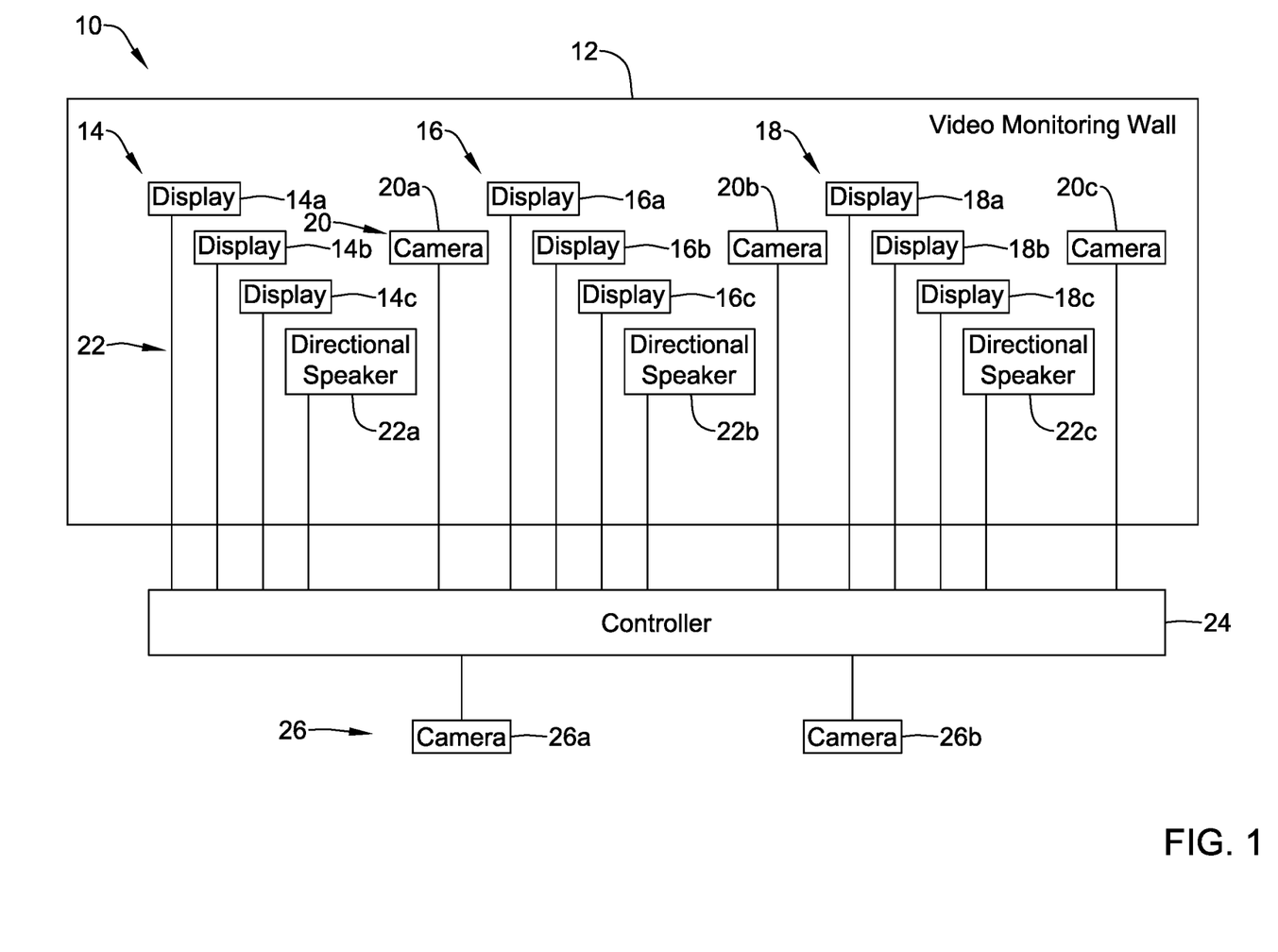
FIG. 1 is a schematic block diagram of an illustrative video monitoring system.

FIG. 1 is a schematic block diagram of an illustrative video monitoring system 10. The illustrative video monitoring system 10 includes a video monitoring wall 12. The video monitoring wall 12 includes a number of displays 14 individually labeled as 14a, 14b and 14c, a number of displays 16 individually labeled as 16a, 16b and 16c and a number of displays 18 individually labeled as 18a, 18b and 18c. While a total of three sets of displays 14, 16 and 18 are shown, with each set including a total of three displays, it will be appreciated that this is merely illustrative, as the video monitoring wall 12 may include any number of displays and may include a substantially greater number of displays. In some cases, the three displays 14 may be separate monitors. In some cases, the three displays 14 may refer to a first region of a larger monitor, such as a wide screen LCD display or even a projected display. Similarly, the three displays 16 and the three displays 18 may each be separate monitors or second and third regions, for example, of a larger display.

In some cases, the displays 14 may be considered as being assigned to a first operator, the displays 16 may be considered as being assigned to a second operator and the displays 18 may be considered as being assigned to a third operator. Each of the operators may be responsible for monitoring the video streams that are displayed on each of the displays that are assigned to them. In some cases, each of the displays may alternate between displaying one of a plurality of video streams that are assigned to a particular display. In some cases, each of displays may display other information such as alerts, warnings, messages, geographical maps, sensor readings, information feeds, standard operating procedures (SOP) and/or other information relevant to the particular operator responsible for monitoring the corresponding display.

In some cases, the displays may be dynamically assigned to each of the operators based on, for example, the working schedule of the operators, the responsibility assigned to each of the operators, and the like. Alternatively, or in addition, the particular video streams may be dynamically assigned to the displays based on, for example, the working schedule of the operators, the responsibility assigned to each of the operators, and the like.

The illustrative video monitoring system 10 includes a number of cameras 20 individually labeled as 20a, 20b and 20c. While a total of three cameras 20 are shown, this is merely illustrative, as the video monitoring system 10 may include any number of cameras 20. In some cases, the video monitoring system 10 may include one camera 20 that is disposed proximate the displays 14, another camera 20 that is disposed proximate the displays 16, and another camera 20 that is disposed proximate the displays 18. In some cases, each set of displays 14, 16 and 18 may include multiple cameras 20. In some cases, one camera 20 may correspond to two or more sets of displays 14, 16, and 18, for example. In some cases, the cameras 20 are disposed relative to the video monitoring wall 12 such that each of the cameras 20 have a field of view (FOV) that is directed toward a viewing side of the video monitoring wall 12 (e.g. toward the operators). In some instances, as will be shown in FIG. 2, each of the cameras 20 may have a FOV that includes a corresponding workstation that is assigned to a particular operator. Each of the cameras 20 may be considered as producing a local video stream.

The illustrative video monitoring system 10 includes a number of directional speakers 22 individually labeled as 22a, 22b and 22c. While a total of three directional speakers 22 are shown, this is merely illustrative, as the video monitoring system 10 may include any number of directional speakers 22. Each of the directional speakers 22 may be considered as being focused speakers or parametric speakers, and are configured to emit sound in a narrow or focused band. In some cases, the sound emitted by one of the directional speakers 22 may be audible to a particular operator that is within the narrow band of the directional speaker 22, and may not be audible to neighboring operators that are outside of that narrow band.

In some cases, the video monitoring system 10 may include one directional speaker 22 that is disposed proximate the displays 14, another directional speaker 22 that is disposed proximate the displays 16, and another directional speaker 22 that is disposed proximate the displays 18. In some cases, each set of displays 14, 16 and 18 may include one or more directional speakers 22. In some cases, one directional speaker 22 may correspond to two or more sets of displays 14, 16, and 18. These are just examples. In some cases, at least some of the directional speakers 22 are configured to pivot or tilt, and a controller 24 may be configured to instruct one or more of the directional speakers 22 to pivot or tilt in order to be more closely aim the one or more directional speakers 22 at the current location of the particular one of the plurality of operators (e.g. as identified by the one or more cameras 20). In some cases, at least some of the directional speakers 22 are mapped to corresponding ones of the cameras 20.

The illustrative video monitoring system 10 includes the controller 24 that is operably coupled with the displays 14, 16, 18, the cameras 20 and the directional speakers 22. The controller 24 is configured to identify that a desired action should be taken by a particular one of the plurality of operators, where the desired action is based at least in part on the one or more video streams and/or other information assigned to the particular one of the plurality of operators. In some cases, each of the plurality of video streams may be assigned to a particular one of the plurality of operators for monitoring based at least in part on a posted work schedule of each of the plurality of operators. The desired action may include, for example, simply directing the operator's attention to the video monitoring wall, investigating a possible event, activating an alarm, following a Standard Operating Procedure (SOP) and/or perform some other desired action or actions.

In the example shown, the controller 24 is configured to analyze the one or more local video streams using video analytics to ascertain a current location of a particular one of the plurality of operators in front of the video monitoring wall 12. In some cases, for example, the controller 24 may perform facial recognition on the one or more local video streams in order to ascertain the current location of the particular one of the plurality of operators. In some cases, there may be multiple operators in front of the video monitoring wall 12, and analyzing the one or more local video streams to ascertain the current location of the particular one of the plurality of operators in front of the video monitoring wall 12 may include performing facial recognition to positively identify the particular one of the plurality of operators.

The controller 24 is configured to direct an audio cue and/or audio message to the current location of the particular one of the plurality of operators using one or more of the directional speakers 22. As an example, the audio cue and/or audio message that is directed to the current location of the particular one of the plurality of operators may include an alarm tone and/or a natural language instruction to take the desired action. As an example, the audio message directed to the current location of the particular one of the plurality of operators may include a name of the particular one of the plurality of operators to personalize the audio message. In some cases, the controller 24 may be configured to display supporting information on the displays assigned to the particular one of the plurality of operators. In some cases, the supporting information may include alphanumeric information that is superimposed over one or more of the video streams being displayed one or more of the displays 14, 16 and 18 of the video monitoring wall 12. In some cases, the alphanumeric information may provide further details regarding the possible event. In some cases, the supporting information may include alerts, warnings, messages, icons, geographical maps, sensor readings, information feeds such as from social media platforms and/or a communication feed among the plurality of operators, standard operating procedures (SOP) and/or other information.

In some cases, each of the plurality of video streams that are assigned to a particular one of the plurality of operators are arranged in a first region of the video monitoring wall 12. As an example, say that the particular operator is assigned to each of the displays 14. Upon determining that the desired action should be taken, the controller 24 may be configured to display supporting information in the first region of the video monitoring wall 12, such as the displays 14. In some cases, when the desired action is in response to a possible event identified in one or more of the plurality of video streams, the supporting information that is displayed in the first region may include one or more of the plurality of video streams that capture the possible event.

As noted, the illustrative video monitoring system 10 includes cameras 20 that are configured to see the viewing side of the video monitoring wall 12, and thus may be positioned to locate operators that are at their assigned workstations. Operators do not always stay at their assigned workstations, as an operator may leave their workstation for a break, to get a cup of coffee, or the like. In some cases, the video monitoring system 10 may include cameras 26, individually labeled as 26a and 26b, that are configured and positioned to see other parts of a control room that are removed from the workstations. For example, the cameras 26 may view the coffee maker, or the drinking fountain. These are just examples. The cameras 26 are also coupled to the controller 24. Cameras 26 may be used to identify a current location of the operators when they are not at their assigned workstation, and the controller 24 may direct an audio message to that location using one or more of the directional speakers.

In some cases, at least some of the cameras 20 and/or the cameras 26 may include independently moveable bases that allow translation of the cameras 20 and/or the cameras 26 relative to the video monitoring wall 12. Accordingly, at least some of the cameras 20 and/or the cameras 26 may be able to move to a position that aligns with a detected location of a particular operator. In some cases, at least some of the directional speakers 22 may include independently moveable bases that allow translation of the directional speakers 22 relative to the video monitoring wall 12. Accordingly, at least some of the directional speakers 22 may be able to move to aposition that aligns with the detected location of the particular operator. In some cases, the cameras 20, the cameras 26 and the directional speakers 22 may not be able to translate, but can pivot to more appropriately align the detected location of the particular operator.

Figure 2:
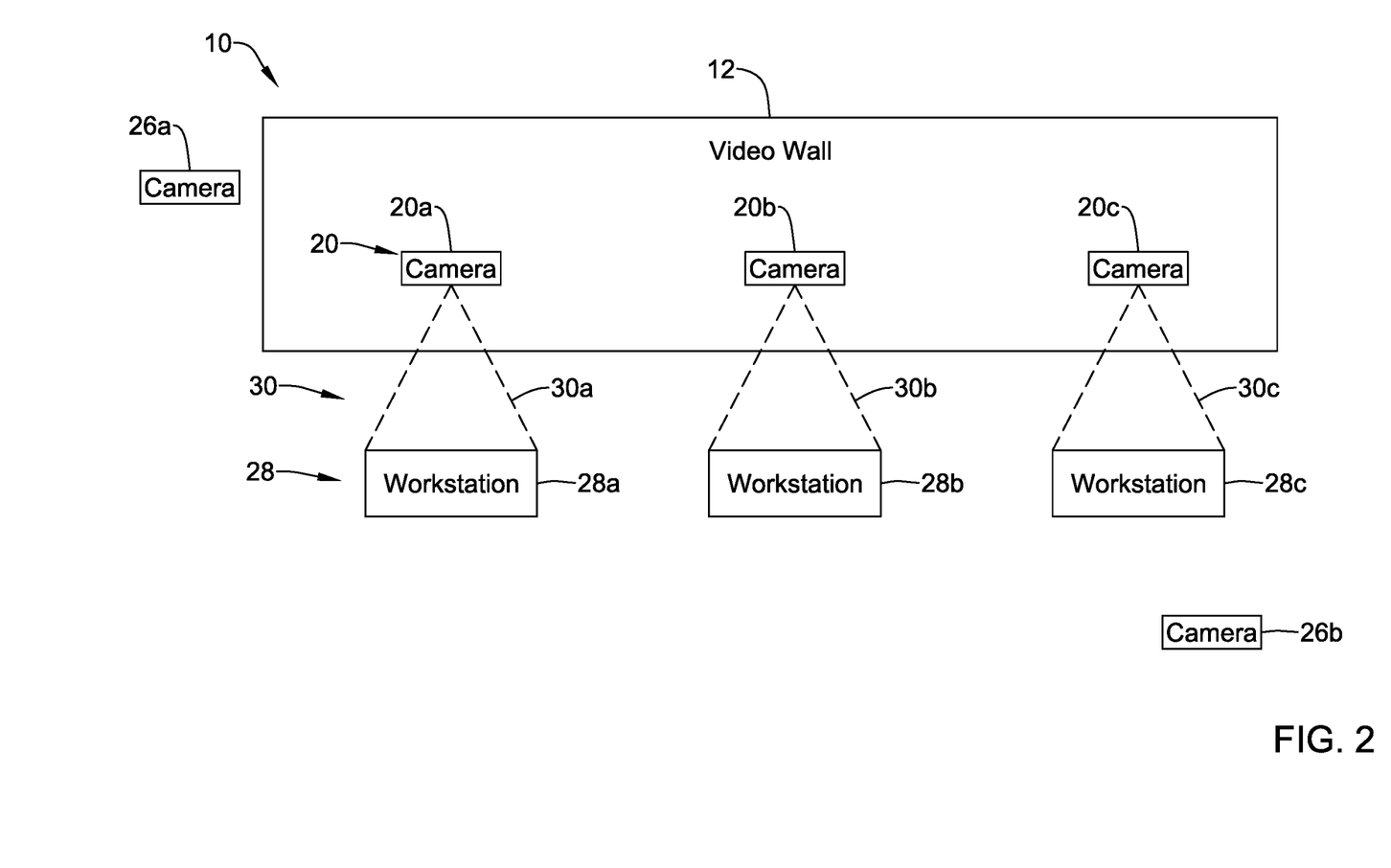
FIG. 2 is a schematic block diagram of the illustrative video monitoring system of FIG. 1.

FIG. 2 is a schematic block diagram showing additional features of the illustrative video monitoring system 10. As seen in FIG. 2, a number of workstations 28 are disposed on the viewing side of the video monitoring wall 12 such that operators positioned at the workstations 28 are able to view at least some of the displays 14, 16 and 18. While a total of three workstations 28 are shown, it will be appreciated that the video monitoring system 10 may include any number of workstations 28, and in some cases may include substantially more than three workstations 28. In some cases, each workstation 28 may include a keyboard and mouse, or other data entry devices, that the operators can use to manipulate the video streams that are shown on their particular displays 14, 16 and 18, and to send instructions to the appropriate authorities. In some cases, each workstation 28 is positioned such that an operator positioned at the particular workstation 28 is able to see the particular displays 14, 16 and 18 that they are assigned. Any video streams assigned to a particular operator will be displayed on the particular displays 14, 16 and 18 that they are assigned.

As seen, each of the cameras 20 have a field of view (FOV) 30, individually labeled as 30a, 30b and 30c. While three cameras 20 are shown, it will be appreciated that this is merely illustrative. As shown, each of the cameras 20 have a FOV 30 that includes a particular workstation 28. In some cases, one camera 20 may have a FOV 30 that includes more than one workstation 28. In some cases, the FOV 30 of at least some of the cameras 20 are adjustable, and the controller 24 may be configured to instruct one or more of the cameras 20 to pan, tilt or zoom, thereby changing its FOV 30, in order to locate the current location of a particular one of the plurality of operators.

Figure 3:
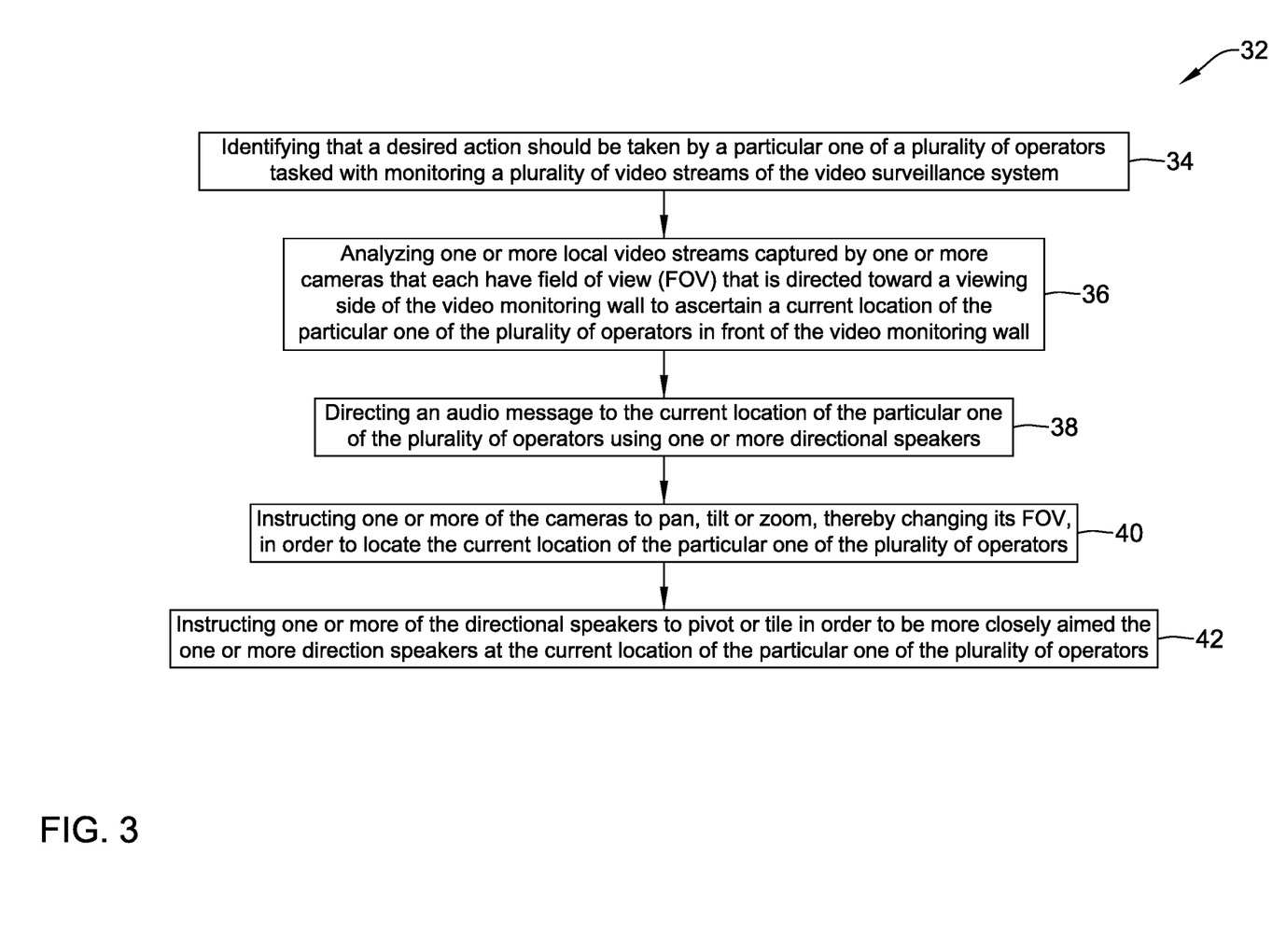
FIG. 3 is a flow diagram showing an illustrative method for monitoring a video surveillance system.

FIG. 3 is a flow diagram showing an illustrative method 32 for monitoring a video surveillance system (such as the video monitoring system 10) via a video monitoring wall (such as the video monitoring wall 12). In some cases, the method 32 may be considered as representing a series of steps that may be carried out by one or more processors (such as of the controller 24) when the one or more processors execute executable instructions that are storable on a non-transitory, computer-readable storage medium. The illustrative method 32 includes identifying that a desired action should be taken by a particular one of a plurality of operators tasked with monitoring a plurality of video streams of the video surveillance system, as indicated at block 34.

One or more local video streams captured by one or more cameras that each have a field of view (FOV) that is directed toward a viewing side of the video monitoring wall are analyzed to ascertain a current location of the particular one of the plurality of operators in front of the video monitoring wall, as indicated at block 36. In some cases, analyzing the one or more local video streams to ascertain the current location of the particular one of the plurality of operators in front of the video monitoring wall may include performing facial recognition to positively identify the particular one of the plurality of operators.

An audio cue and/or message is directed to the current location of the particular one of the plurality of operators using one or more directional speakers, as indicated at block 38. In some cases, the method 32 may additionally include instructing one or more of the cameras to pan, tilt or zoom, thereby changing its FOV, in order to locate the current location of the particular one of the plurality of operators, as indicated at block 40. In some cases, the method 32 may additionally include instructing one or more of the directional speakers to pivot or tilt in order to be more closely aim the one or more direction speakers at the current location of the particular one of the plurality of operators, as indicated at block 42.

Figure 4:
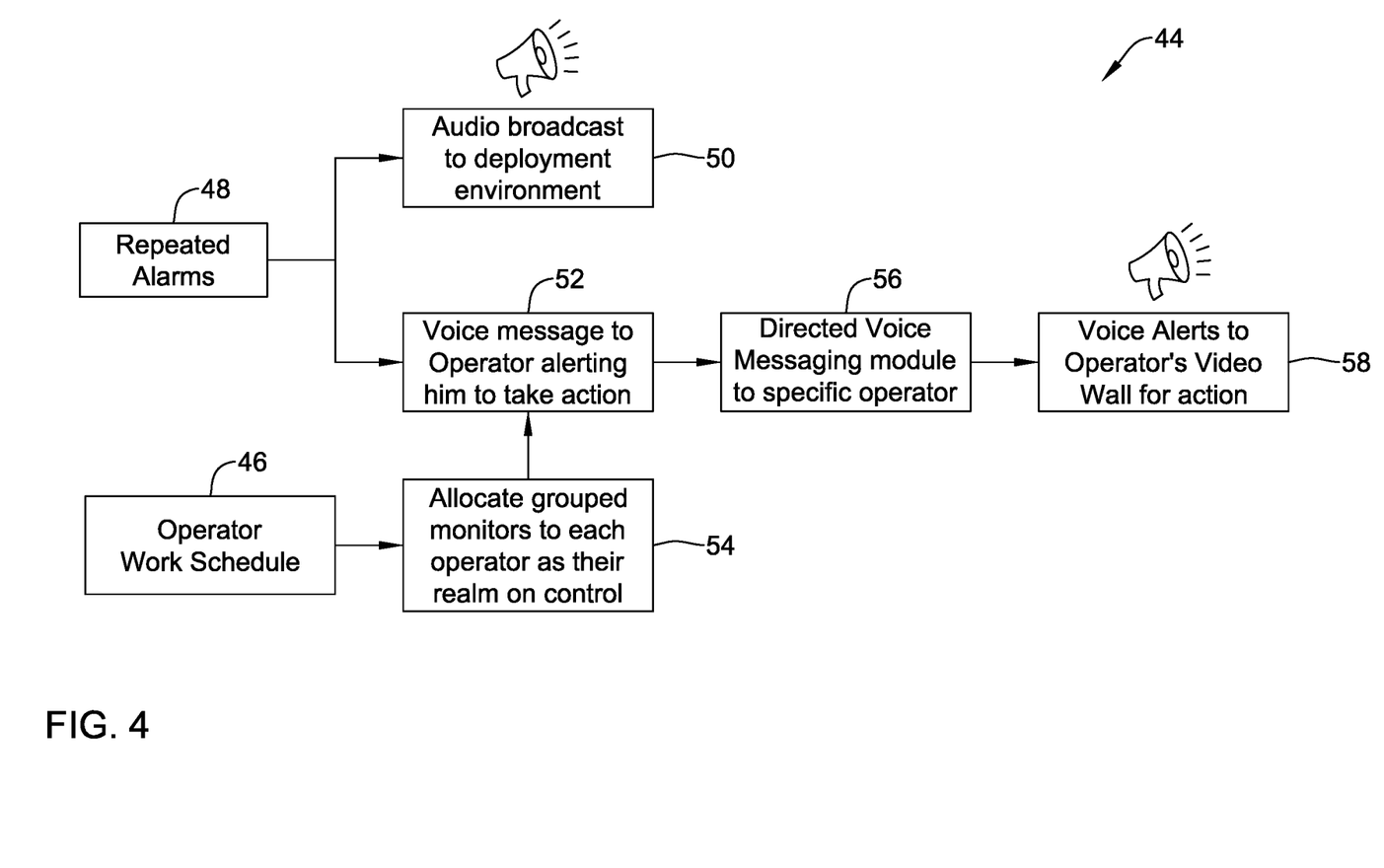
FIG. 4 is a flow diagram showing an illustrative method.

FIG. 4 is a flow diagram showing an illustrative method 44 for processing alarms. At block 46, an operator work schedule is determined or selected. At block 48, there is an indication of repeated alarms that should be addressed. An audio broadcast is automatically provided to an environment where the repeated alarms are occurring, as indicated at block 50. In some cases, the audio broadcast may include instructions to one or more people in the environment to either stop what they have been doing, for example, or perhaps telling them to do something new or different. At the same time, a voice message is provided to the operator, as indicated at block 52, alerting the operator to take action. In some cases, the grouped monitors are allocated to particular operators at block 54, hence the system knows which operator is responsible for an area in which the alarms keep recurring. A directed voice module creates an audible message to alert the responsible operator, as indicated at block 56. The audible message is broadcast from the video monitoring wall 12, such as via one of the directional speakers 22, as indicated at block 58, to provide an audible alert or audible message to the particular operator without unduly disturbing the other operators.

Figure 5:
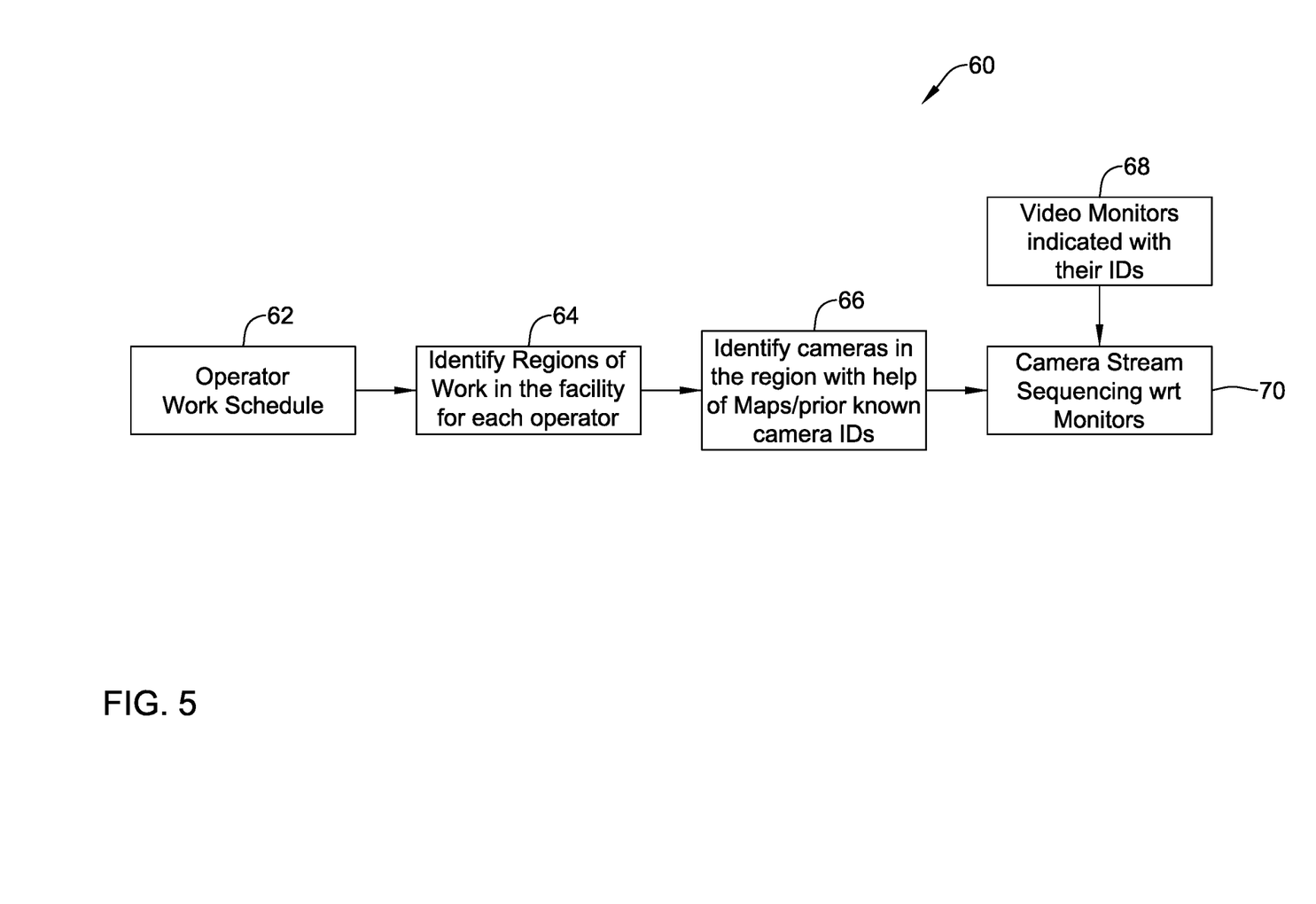
FIG. 5 is a flow diagram showing an illustrative method.

FIG. 5 is a flow diagram showing an illustrative method 60 for allocating monitors. The method 60 begins with the operator work schedule, as indicated at block 62. The system identifies which regions of the facility each operator will be responsible, as indicated at block 64. The system identifies cameras within each region of the facility, as indicated at block 66. This may include obtaining information from maps of the facility, or perhaps prior known camera identifiers (IDs). As indicated at block 68, the system receives information regarding the video monitors and their IDs. At block 70, the system determines which camera video streams will be streamed to each of the available monitors based at least in part on the operator work schedule, the regions each of the operators are responsible for monitoring and/or the assignment between the available monitors and each of the operators.

Figure 6:
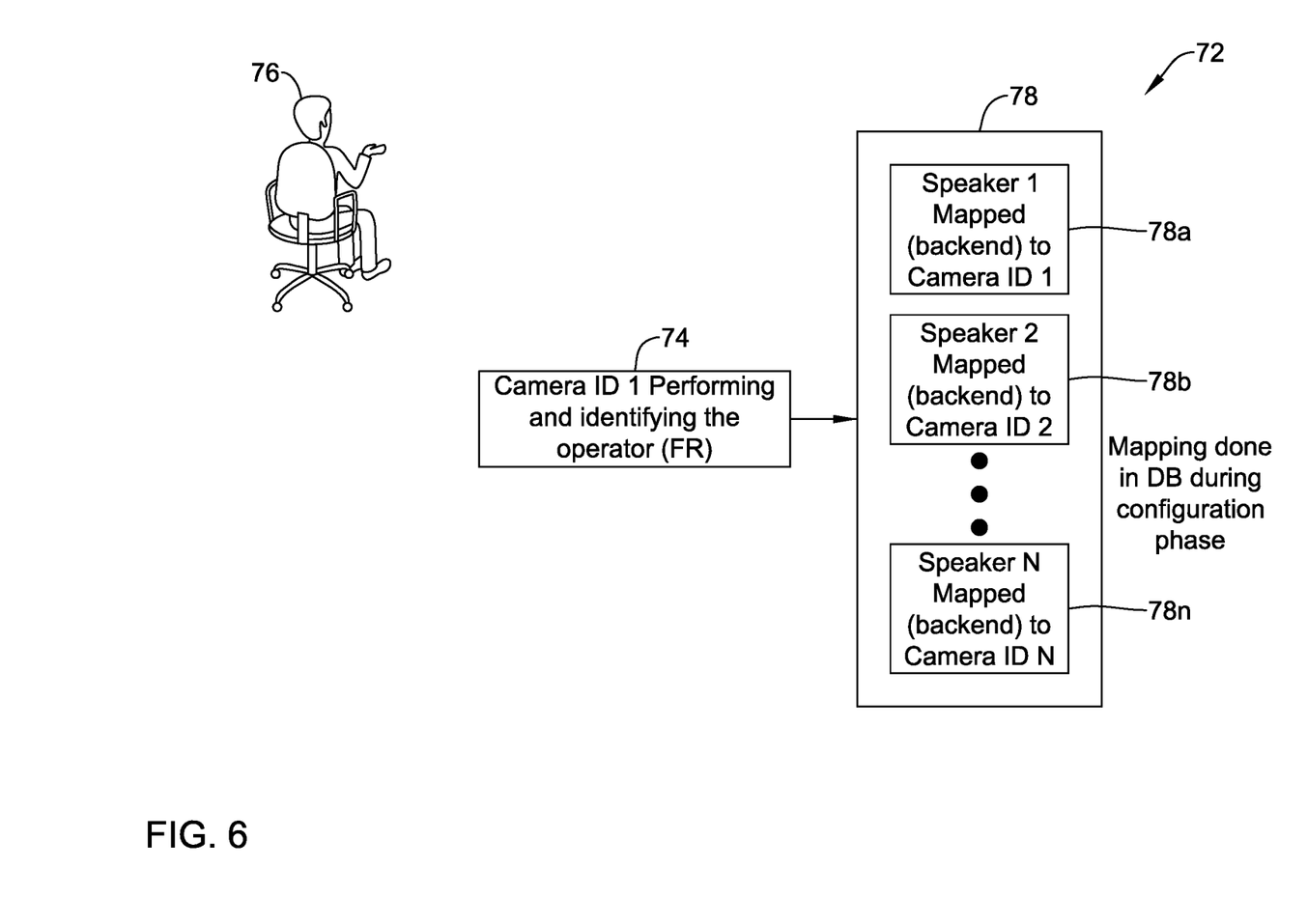
FIG. 6 is a flow diagram showing an illustrative method.

FIG. 6 is a flow diagram showing an illustrative method 72 for mapping the cameras (such as the cameras 20) to the directional speakers (such as the directional speakers 22). The illustrative method 72 includes Camera ID 1 identifying an operator 74, such as by performing facial recognition on a local video stream provided by the Camera ID 1. Mapping is done in a database during a configuration phase, as indicated at block 78. Speaker 1 is mapped to Camera ID 1, as indicated at block 78a. Speaker 2 is mapped to Camera ID 2, as indicated at block 78b. This continues through each of the speakers and cameras until the Speaker N is mapped to Camera ID N, as indicated at block 78n.

Figure 7:
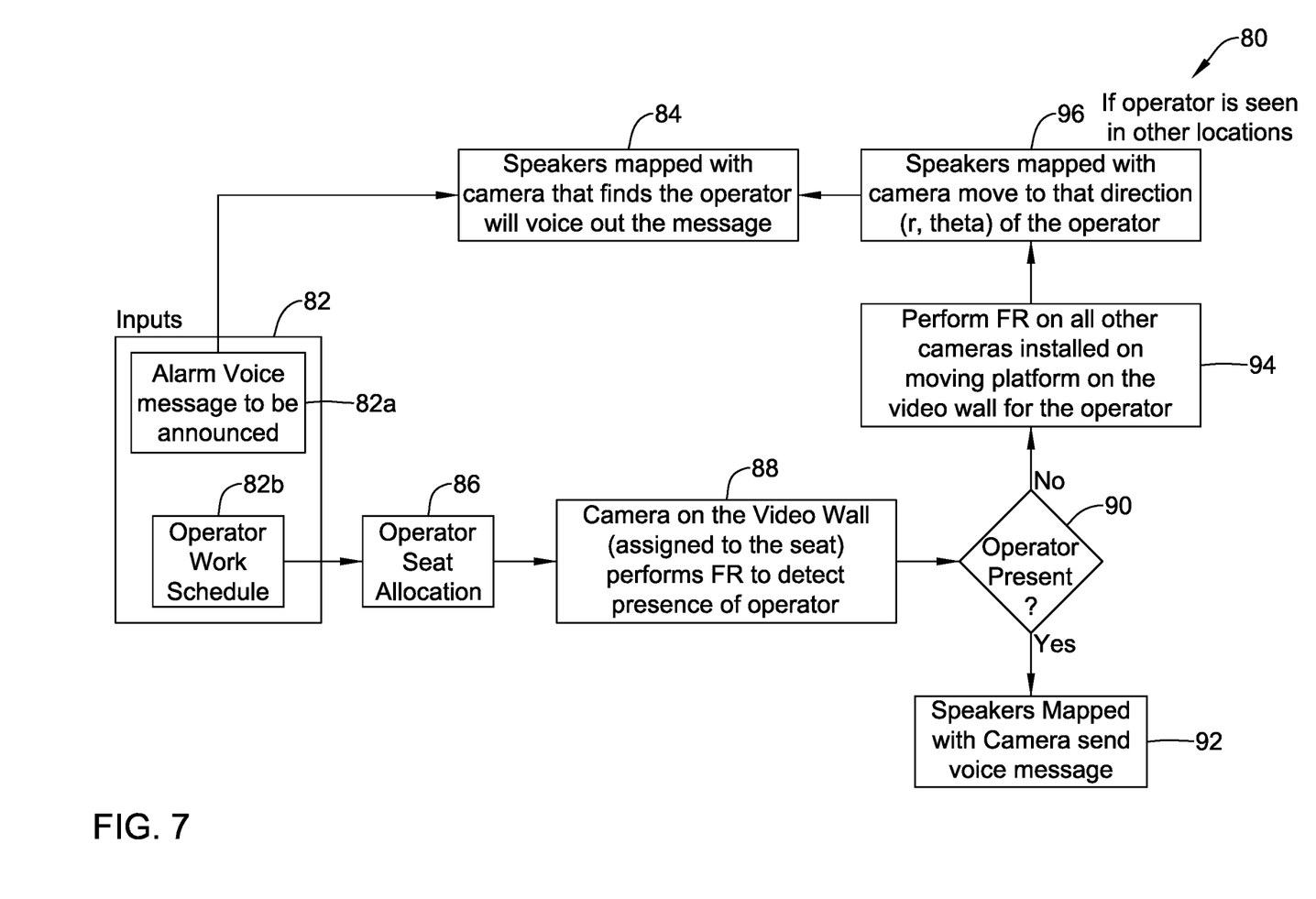
FIG. 7 is a flow diagram showing an illustrative method.

FIG. 7 is a flow diagram showing an illustrative method 80 for directional voice messaging. The method 80 includes inputs 82 such as an alarm voice message to be announced, as indicated at block 82a, and an operator work schedule, as indicated at block 82b. Information from the block 82a is provided to a block 84, where a determination is made as to which directional speaker will announce the message. From the operator work schedule, information is passed to a block 86, where a determination is made as to where each operator should be located. At block 88, a camera that is assigned to a particular operator location performs facial recognition to see if the particular operator is in position. If so, as determined at decision block 90, control passes to block 92 and the speaker that is mapped to that camera sends a voice message directed to the location of the particular operator. If not, facial recognition is performed on video streams from the other cameras (e.g. other cameras 20 and/or cameras 26 of FIG. 2) in order to locate the particular operator in the control room. Once the operator is located, the speaker or speakers that are mapped to that camera will be aimed at the current location of the particular operator, as indicated at block 96, and the message is delivered.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A video monitoring system comprising:
   one or more displays arranged to form a video monitoring wall, the video monitoring wall configured to display a plurality of video streams, wherein each of the plurality of video streams is assigned to a particular one of a plurality of operators for monitoring;
   one or more cameras disposed relative to the video monitoring wall such that each of the one or more cameras has a field of view (FOV) that is directed toward a viewing side of the video monitoring wall, each of the one or more cameras producing a local video stream;
   one or more directional speakers disposed relative to the video monitoring wall such that each of the one or more directional speakers is directed toward a corresponding location on the viewing side of the video monitoring wall;
   a controller operably coupled with the one or more displays, the one or more cameras and the one or more directional speakers, the controller configured to:
   identify that a desired action should be taken by a particular one of the plurality of operators, the desired action is based at least in part on the one or more video streams assigned to the particular one of the plurality of operators;

analyze the one or more local video streams to ascertain a current location of the particular one of the plurality of operators in front of the video monitoring wall; and direct an audio message to the current location of the particular one of the plurality of operators using one or more of the directional speakers.

2. The video monitoring system of claim 1, wherein the controller is configured to perform facial recognition on the one or more local video streams in order to ascertain the current location of the particular one of the plurality of operators.

3. The video monitoring system of claim 1, wherein the audio message that is directed to the current location of the particular one of the plurality of operators comprises instructions to take the desired action.

4. The video monitoring system of claim 1, wherein each of the plurality of video streams that are assigned to the particular one of the plurality of operators are arranged in a first region of the video monitoring wall.

5. The video monitoring system of claim 4, wherein upon determine that the desired action should be taken, the controller is configured to display supporting information in the first region of the video monitoring wall.

6. The video monitoring system of claim 5, wherein when the desired action is in response to a possible event identified in one or more of the plurality of video streams, the supporting information that is displayed in the first region comprises one or more of the plurality of video streams that capture the possible event.

7. The video monitoring system of claim 6, wherein the supporting information includes alphanumeric information that is superimposed over one or more of the video streams being displayed in the first region of the video monitoring wall.

8. The video monitoring system of claim 7, wherein the alphanumeric information provides further details regarding the possible event.

9. The video monitoring system of claim 1, wherein the audio message directed to the current location of the particular one of the plurality of operators comprises a name of the particular one of the plurality of operators.

10. The video monitoring system of claim 1, wherein analyzing the one or more local video streams to ascertain the current location of the particular one of the plurality of operators in front of the video monitoring wall comprises performing facial recognition to positively identify the particular one of the plurality of operators.

11. The video monitoring system of claim 1, wherein the FOV of at least some of the one or more cameras are adjustable, and the controller is configured to instruct one or more of the cameras to pan, tilt or zoom, thereby changing its FOV, in order to locate the current location of the particular one of the plurality of operators; and/or at least some of the one or more cameras are mountable to a moveable base that is configured to translate relative to the video monitoring wall, and the controller is configured to instruct one or more of the cameras to translate relative to the video monitoring wall.

12. The video monitoring system of claim 1, wherein at least some of the directional speakers are configured to pivot or tilt, and the controller is configured to instruct one or more of the directional speakers to pivot or tilt in order to be more closely aim the one or more direction speakers at the current location of the particular one of the plurality of operators; and/or at least some of the one or more directional speakers are mountable to a moveable base that is configured to translate relative to the video monitoring wall, and the controller is configured to instruct one or more of the directional speakers to translate relative to the video monitoring wall.

13. The video monitoring system of claim 1, wherein at least some of the one or more directional speakers are mapped to corresponding ones of the one or more cameras.

14. The video monitoring system of claim 1, wherein each of the plurality of video streams is assigned to a particular one of the plurality of operators for monitoring based at least in part on a posted schedule of each of the plurality of operators.

15. A method for monitoring a video surveillance system via a video monitoring wall, the method comprising:

identifying that a desired action should be taken by a particular one of a plurality of operators tasked with monitoring a plurality of video streams of the video surveillance system;

analyzing one or more local video streams captured by one or more cameras that each have a field of view (FOV) that is directed toward a viewing side of the video monitoring wall to ascertain a current location of the particular one of the plurality of operators in front of the video monitoring wall; and directing an audio message to the current location of the particular one of the plurality of operators using one or more directional speakers.

16. The method of claim 15, wherein analyzing the one or more local video streams to ascertain the current location of the particular one of the plurality of operators in front of the video monitoring wall comprises performing facial recognition to positively identify the particular one of the plurality of operators.

17. The method of claim 15, further comprising instructing one or more of the cameras to pan, tilt or zoom, thereby changing its FOV, in order to locate the current location of the particular one of the plurality of operators.

18. The method of claim 15, further comprising instructing one or more of the directional speakers to pivot or tilt in order to be more closely aimed the one or more direction speakers at the current location of the particular one of the plurality of operators.

19. A non-transitory computer readable medium storing instructions thereon that when executed by one or more processors cause the one or more processors to:

identify that a desired action should be taken by a particular one of a plurality of operators tasked with monitoring a plurality of video streams of a video surveillance system;

analyze one or more local video streams captured by one or more cameras that each have a field of view (FOV) that is directed toward a viewing side of a video monitoring wall of the video surveillance system to ascertain a current location of the particular one of the plurality of operators in front of the video monitoring wall; and direct an audio message to the current location of the particular one of the plurality of operators using one or more directional speakers.

20. The non-transitory computer readable medium of claim 19, wherein the instructions when executed by one or more processors cause the one or more processors to:

instruct one or more of the cameras to pan, tilt or zoom, thereby changing its FOV, in order to locate the current location of the particular one of the plurality of operators; and/or instruct one or more of the directional speakers to pivot or tilt in order to be more closely aimed the one or more direction speakers at the current location of the particular one of the plurality of operators.

* * * * *